(12) United States Patent
Orii et al.

(10) Patent No.: US 11,649,886 B2
(45) Date of Patent: May 16, 2023

(54) WAVE GENERATOR OF STRAIN WAVE GEARING DEVICE

(71) Applicant: HARMONIC DRIVE SYSTEMS INC., Tokyo (JP)

(72) Inventors: Daisuke Orii, Azumino (JP); Syuhei Kobayashi, Azumino (JP); Norio Shirokoshi, Azumino (JP); Hiroshi Yamazaki, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 202 days.

(21) Appl. No.: 17/282,077

(22) PCT Filed: Nov. 22, 2018

(86) PCT No.: PCT/JP2018/043253
§ 371 (c)(1),
(2) Date: Apr. 1, 2021

(87) PCT Pub. No.: WO2020/105187
PCT Pub. Date: May 28, 2020

(65) Prior Publication Data
US 2021/0372515 A1    Dec. 2, 2021

(51) Int. Cl.
*F16H 49/00* (2006.01)
*F16C 19/04* (2006.01)
*F16H 1/32* (2006.01)

(52) U.S. Cl.
CPC ........... *F16H 49/001* (2013.01); *F16C 19/04* (2013.01); *F16H 1/32* (2013.01); *F16C 2361/61* (2013.01)

(58) Field of Classification Search
CPC .................................................. F16H 41/001
(Continued)

(56) References Cited

U.S. PATENT DOCUMENTS

| 2,581,958 A | 1/1952 | Kingston |
| 4,120,544 A | 10/1978 | Huber |

(Continued)

FOREIGN PATENT DOCUMENTS

| JP | S61206154 U | 12/1986 |
| JP | H0287152 U | 7/1990 |

(Continued)

OTHER PUBLICATIONS

Office Action dated Mar. 14, 2022, by the U.S. Patent and Trademark Office in U.S. Appl. No. 17/282,055.

(Continued)

*Primary Examiner* — Ha Dinh Ho
(74) *Attorney, Agent, or Firm* — Buchanan Ingersoll & Rooney PC

(57) ABSTRACT

An outer-ring lubrication groove pattern formed in an outer-race raceway surface and an inner-race lubrication groove pattern formed in an inner-race raceway surface of a wave generator bearing of a strain wave gearing device are patterns in which linear lubrication grooves having very small widths and depths of several micrometers or less are arranged at fine pitches of several micrometers or less. The inner-race lubrication groove pattern includes a second groove pattern formed in long-axis-side inner-race raceway surface portions to hold the lubricant, and a first groove pattern formed in short-axis-side inner-race raceway surface portions to hold the lubricant and guide the lubricant to the second groove pattern. This configuration improves the contact state between balls and the inner-race and outer-race raceway surfaces of the wave generator bearing, thus reducing the coefficient of friction therebetween.

11 Claims, 3 Drawing Sheets

(58) Field of Classification Search
USPC .......................................................... 74/640
See application file for complete search history.

(56) References Cited

U.S. PATENT DOCUMENTS

| | | | |
|---|---|---|---|
| 4,159,152 A | 6/1979 | Bjork | |
| 8,876,396 B2* | 11/2014 | Guilford | F16C 33/62 |
| | | | 384/549 |
| 9,234,548 B2* | 1/2016 | Frank | F16C 33/586 |
| 9,366,295 B2* | 6/2016 | Sebald | F16C 37/002 |
| 10,612,595 B2 | 4/2020 | Zhong et al. | |
| 2002/0178861 A1 | 12/2002 | Kobayashi | |
| 2012/0093453 A1* | 4/2012 | Horvat | F16C 35/067 |
| | | | 384/513 |
| 2018/0080543 A1 | 3/2018 | Kusumoto | |
| 2019/0368594 A1 | 12/2019 | Sakata | |

FOREIGN PATENT DOCUMENTS

| | | |
|---|---|---|
| JP | H0291238 U | 7/1990 |
| JP | 2005321048 A | 11/2005 |
| JP | 2008223942 A | 9/2008 |
| JP | 2009041655 A | 2/2009 |
| JP | 2009108901 A | 5/2009 |
| JP | 2015190600 A | 11/2015 |
| JP | 2017214996 A | 12/2017 |
| WO | 2017077657 A1 | 5/2017 |

OTHER PUBLICATIONS

International Search Report (PCT/ISA/210) with translation and Written Opinion (PCT/ISA/237) dated Feb. 12, 2019, by the Japanese Patent Office as the International Searching Authority for International Application No. PCT/JP2018/043253.

International Search Report (PCT/ISA/210) and Written Opinion (PCT/ISA/237) dated Feb. 5, 2019, by the Japanese Patent Office as the International Searching Authority for International Application No. PCT/JP2018/043252. (10 pages).

Notice of Allowance dated Dec. 18, 2022, by the U.S. Patent and Trademark Office in U.S. Appl. No. 17/282,055 (9 pages).

* cited by examiner

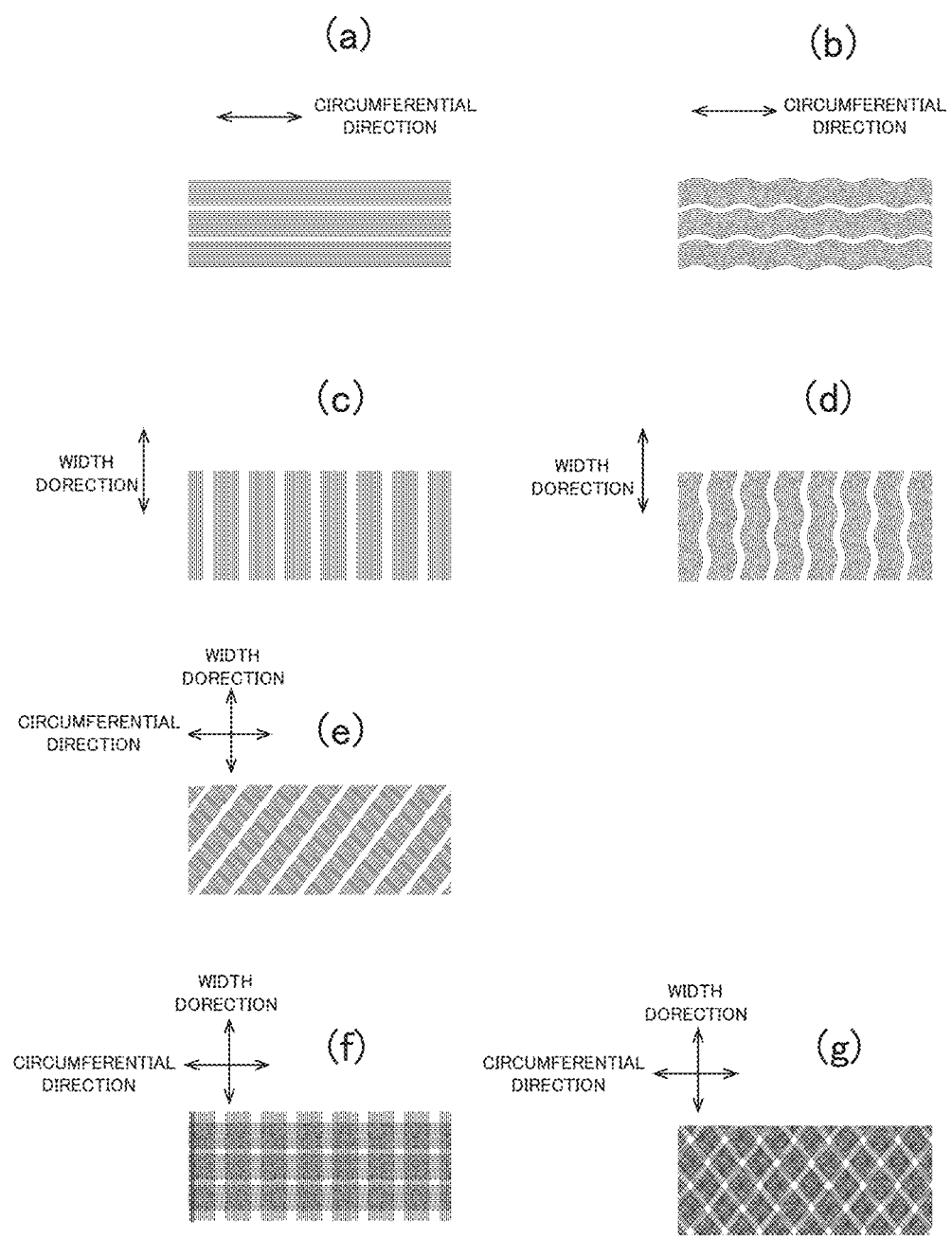

WAVE GENERATOR OF STRAIN WAVE GEARING DEVICE

TECHNICAL FIELD

The present invention relates to a wave generator of a strain wave gearing device, and more specifically relates to a structure for lubricating an inner-race raceway surface and an outer-race raceway surface in a wave generator bearing caused to flex into an ellipsoidal form by a wave generator plug.

BACKGROUND ART

A strain wave gearing device has a rigid internally toothed gear, a flexible externally toothed gear, and a wave generator. The externally toothed gear is caused to flex in a radial direction by the wave generator, and the externally toothed gear is caused to partially mesh with the internally toothed gear. The wave generator is caused to rotate, thereby moving the meshing positions of the gears in a circumferential direction and generating relative rotation between the gears, the relative rotation resulting from a difference in the number of teeth between the gears. A known example of a wave generator is one having a rigid wave generator plug and a wave generator bearing, the wave generator bearing being mounted on an ellipsoidal external peripheral surface of the wave generator plug.

The wave generator bearing has an outer race and an inner race capable of flexing in the radial direction, and a plurality of balls or other rolling elements rollably mounted between the races. The wave generator bearing is caused to flex into an ellipsoidal shape by the wave generator plug. The wave generator bearing fits into an inner side of the externally toothed gear and holds the externally toothed gear and the wave generator plug in a relatively rotatable state.

When the strain wave gearing device is used as a reduction gear, for example, the wave generator plug is used a rotation input element, and the internally toothed gear or the externally toothed gear is used a reduced rotation output element. The wave generator bearing and the externally toothed gear rotate while being repeatedly displaced in the radial direction. An inner race of the wave generator bearing rotates at high speed along with the wave generator plug, and an outer race of the wave generator bearing rotates integrally with the externally toothed gear. Balls inserted between the inner and outer races roll along raceway surfaces of the outer race and the inner race, whereby the wave generator plug and the externally toothed gear can smoothly rotate relative to each other with a small amount of torque.

During operation under specific conditions, such as operation under high load, operation at low-speed rotation, and operation when a low-viscosity oil is used to lubricate the wave generator bearing, the state of contact between the balls and the raceway surfaces of the inner and outer races is a state of mixed lubrication, and friction force sometimes increases. Depending on the state of lubrication between the components, the friction force will lose stability, and irregular rotation, etc., will occur. To overcome such adverse situations, an appropriate state of lubrication must be maintained between the balls and the raceway surfaces of the inner and outer races.

Patent Document 1 discloses a wave generator of a strain wave gearing device wherein a lubricant reservoir that holds a lubricant is provided to an inner race of a vibromotive body bearing (a wave generator bearing) mounted on an external peripheral surface of a vibromotive body (a wave generator plug), preventing the vibromotive body bearing from being insufficiently lubricated. In Patent Document 2, fine recessed grooves are formed in raceway surfaces in order to increase the potential for an oil film to be formed between rolling elements and the raceway surfaces. In Patent Document 3, recessed grooves having an oil-retaining function are formed to form a sufficient oil film on one or both sides of contact passage areas of raceway surfaces, where dynamic pressure due to the sliding of rolling elements is readily produced.

PRIOR ART LITERATURE

Patent Documents

Patent Document 1: JP 2015-190600 A
Patent Document 2: JP 2005-321048 A
Patent Document 3: JP 2009-108901 A

SUMMARY OF THE INVENTION

Problems to be Solved by the Invention

In a wave generator of a strain wave gearing device, a wave generator bearing is caused to flex into an ellipsoidal shape by a wave generator plug. Rolling elements positioned at both long-axis ends of the ellipsoidal shape are tightly held between inner and outer races and are rollable in point-contact with raceway surfaces of the inner and outer races. Other rolling elements positioned in portions other than both long-axis ends are rollably and loosely held with gaps between the inner and outer races. Thus, in the wave generator bearing caused to flex into an ellipsoidal shape, the state of contact between the raceway surfaces and the rolling elements changes along a circumferential direction. Even if a satisfactory state of lubrication can be formed in the contact portions where the rolling elements are loosely held between the inner and outer races, lubrication is likely to be insufficient in the contact portions where the rolling elements are tightly held. It is preferred that the portions along the circumferential direction can be kept in an appropriate state of lubrication in accordance with the state of contact.

An object of the present invention, in view of the foregoing, is to provide a wave generator of a strain wave gearing device in which the state of contact between the rolling elements and the raceway surfaces of the inner and outer races of the wave generator bearing is improved, and a lubrication structure capable of reducing a friction coefficient between these components is provided.

Means of Solving the Problems

A wave generator of a strain wave gearing device according to the present invention has a wave generator plug and a wave generator bearing. The wave generator plug is provided with an ellipsoidal external peripheral surface, and the wave generator bearing is mounted and secured to the ellipsoidal external peripheral surface and caused to flex into an ellipsoidal shape. The wave generator bearing has an outer race and inner race capable of flexing in a radial direction, and a plurality of rolling elements inserted in a rollable state between the outer race and the inner race. An inner-race lubrication groove pattern configured from first lubrication grooves and second lubrication grooves is formed in an inner-race raceway surface of the inner race. An outer-race lubrication groove pattern configured from third lubrication grooves is formed in an outer-race raceway surface of the outer race. The first, second, and third lubrication grooves are linear grooves having a width and a depth of several tens of nanometers to several microns, and extend in straight lines, curved lines, or a wave-like form. The inner-race lubrication groove pattern includes a first groove pattern in which the first lubrication grooves are arranged at a pitch of several tens of nanometers to several microns, and a second groove pattern in which the second lubrication grooves are arranged at a pitch of several tens of nanometers to several microns. The outer-race lubrication groove pattern is a pattern in which the third lubrication grooves are arranged at a pitch of several tens of nanometers to several microns. In the inner-race raceway surface, the first groove pattern of the inner-race lubrication groove pattern is formed in short-axis-side inner-race raceway surface portions including positions on the short axis of the ellipsoid, and the second groove pattern of the inner-race lubrication groove pattern is formed in long-axis-side inner-race raceway surface portions including positions on the long axis of the ellipsoid. In the first groove pattern, the first lubrication grooves extend so that the direction in which the first lubrication grooves are aligned includes a directional component facing the circumferential direction of the inner-race raceway surface.

In the present invention, the inner-race lubrication groove pattern and the outer-race lubrication groove pattern, in which fine lubrication grooves are arranged at a fine pitch, are respectively formed in the inner-race raceway surface and the outer-race raceway surface of the wave generator bearing. A good fit between the inner and outer races and the rolling elements can be promoted by forming fine lubrication grooves having a width and depth of several microns or less. Additionally, fine lubrication grooves several microns or less are easily wetted by the lubricant, the lubricant is efficiently held in these grooves (supporting effect), a highly rigid oil film is formed, and the oil film also becomes thicker (dynamic pressure effect).

In the inner-race raceway surface, the first groove pattern, which is configured from lubrication grooves aligned so as to include a directional component facing in the circumferential direction, is formed in short-axis-side inner-race raceway surface portions with which the rolling elements loosely come into contact. For example, the first groove pattern configured from lubrication grooves extending in the circumferential direction is formed. The lubricant in contact with the first groove pattern is guided in the circumferential direction along the lubrication grooves. Long-axis-side inner-race raceway surface portions, with which the rolling elements tightly come into contact, are adjacent to both circumferential sides of the short-axis-side inner-race raceway surface portions. The lubricant is actively supplied from the portions where the first groove pattern is formed toward the second groove pattern formed in the long-axis-side inner-race raceway surface portions, and is held in the lubrication grooves of the second groove pattern. Sufficient lubricant is thereby supplied to and held in contact portions where the rolling elements are in tight contact with the inner and outer-race raceway surfaces. As a result, a state of satisfactory lubrication is formed in the long-axis-side inner-race raceway surface portions.

As such, a satisfactory state of contact can be maintained among the components along the circumferential direction in the wave generator bearing, which rotates while being caused to flex into an ellipsoidal shape, and scorching due to tearing of the oil film can be prevented. Additionally, the improvement in oil-film-holding capability also yields additional effects in that the amount of lubricant coating can be reduced and there is less risk of lubricant leakage.

BRIEF DESCRIPTION OF THE DRAWINGS

FIGS. 3(*a*) to (*g*) are explanatory drawings of examples of groove patterns of fine grooves in a groove formation surface.

MODE FOR CARRYING OUT THE INVENTION

An embodiment of a wave generator of a strain wave gearing device to which the present invention is applied is described below with reference to the drawings. The description below is an example in which the present invention is applied to a wave generator of a cup-type strain wave gearing device. The present invention can be similarly applied to a wave generator of a top-hat-type strain wave gearing device or a flat-type strain wave gearing device.

Figure 1:
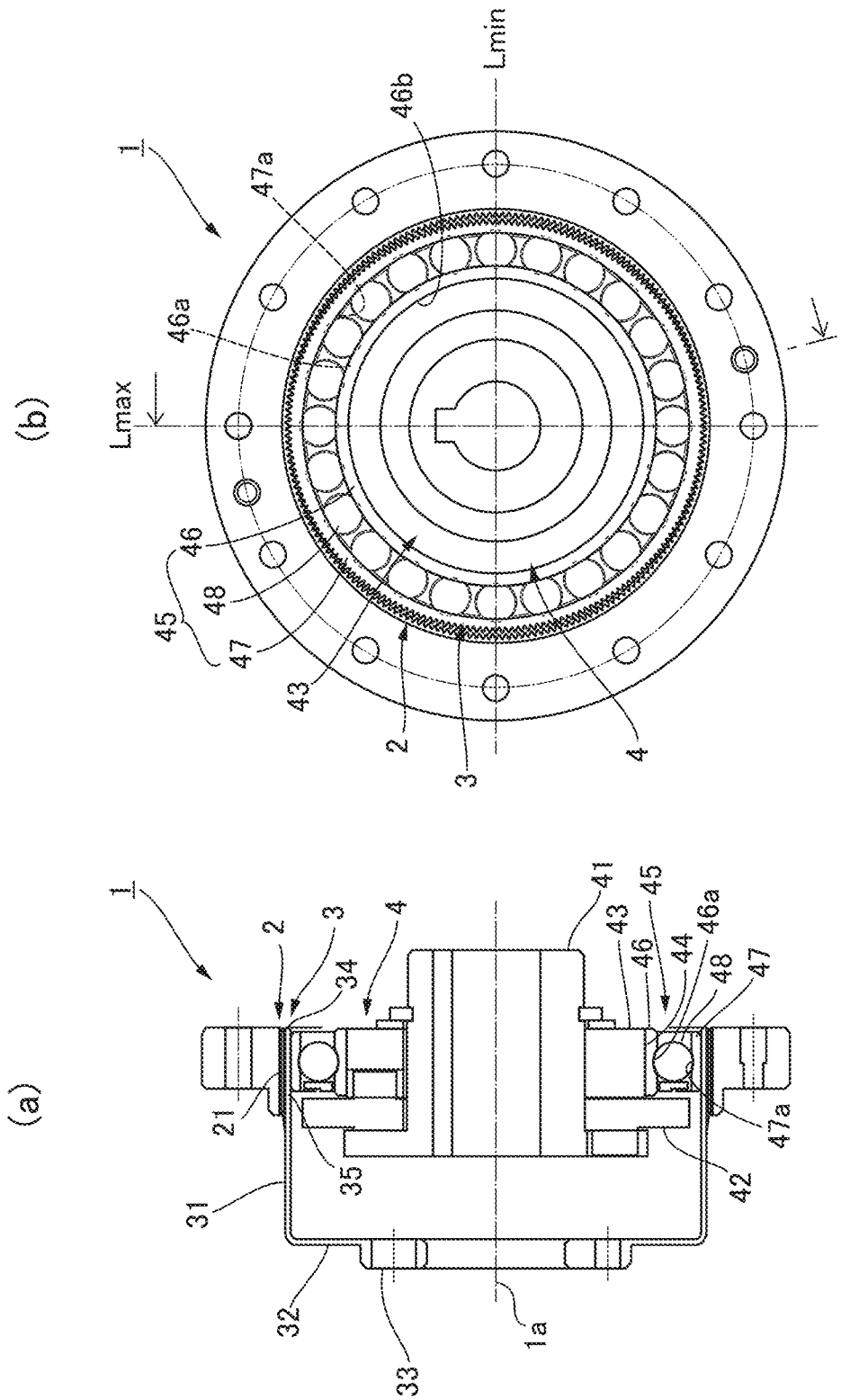
FIG. 1(*a*) is a schematic longitudinal cross-sectional view of one example of a strain wave gearing device to which the present invention is applied, and FIG. 1(*b*) is a schematic end view of the same.

FIG. 1(*a*) is a schematic longitudinal cross-sectional view of an overall configuration of a cup-type strain wave gearing device (referred to below simply as a "strain wave gearing device"), and FIG. 1(*b*) is a schematic end view of the same. A strain wave gearing device 1 is configured from an annular rigid internally toothed gear 2, a cup-shaped flexible externally toothed gear 3 coaxially disposed on an inner side of the internally toothed gear, and an ellipsoidally contoured wave generator 4 fitted into an inner side of the externally toothed gear.

The externally toothed gear 3 is provided with a barrel part 31, a diaphragm 32, and a boss 33, and the externally toothed gear 3 assumes the overall shape of a cup. The barrel part 31 has a cylindrical shape and is capable of flexing in a radial direction. One end of the barrel part 31 is an open end 34, and external teeth 35 are formed in an external peripheral surface portion of the barrel part in the side having the open end 34. The diaphragm 32 extends radially inward as a continuation of the other end of the barrel part 31. The annular boss 33 is formed as a continuation of an internal peripheral edge of the diaphragm 32. The boss 33 is a rigid portion for attaching the externally toothed gear 3 to another member (not shown). The internally toothed gear 2 is disposed so as to surround the external teeth 35 of the externally toothed gear 3. The external teeth 35 are capable of meshing with internal teeth 21 formed in an internal peripheral surface of the internally toothed gear 2.

The wave generator 4 is configured from a hollow hub 41, a rigid wave generator plug 43 mounted on an external periphery of the hub with an Oldham coupling 42 therebetween, and a wave generator bearing 45 fitted into an ellipsoidal plug external peripheral surface 44 (non-circular external peripheral surface) of the wave generator plug 43. The portion in the barrel part 31 of the externally toothed gear 3 where the external teeth 35 are formed is caused by the wave generator 4 to flex from a true circle, which is the initial state, into an ellipsoidal shape. The external teeth 35 mesh with the internal teeth 21 of the internally toothed gear 2 at positions of both ends of a long axis Lmax of the ellipsoidal shape thereof.

The wave generator bearing 45 is provided with a circular inner race 46 and outer race 47, which are capable of flexing in the radial direction, and a plurality of balls 48 mounted in a rollable state between the races. The wave generator bearing 45 is fitted into an inner side of the externally toothed gear 3 while having been made to flex into an ellipsoidal shape by the wave generator plug 43, and holds the externally toothed gear 3 and the wave generator plug 43 in a state that enables relative rotation therebetween. The wave generator plug 43 is linked to a high-speed rotation input shaft (not shown). The balls 48, which are inserted between the ellipsoidally flexed inner race 46 and outer race 47, roll along an inner-race raceway surface 46a and an outer-race raceway surface 47a, and the wave generator plug 43 and the externally toothed gear 3 are able to smoothly rotate relative to each other with a small amount of torque. An internal peripheral surface 46b of the inner race 46 of the wave generator bearing 45 is secured by press-fitting and an adhesive to the ellipsoidally contoured plug external peripheral surface 44 of the wave generator plug 43.

In the wave generator bearing 45 caused to flex into an ellipsoidal shape by the wave generator plug 43, the plurality of balls 48 positioned at both ends of the long axis Lmax of the ellipsoidal shape are tightly held between the inner and outer races 46, 47, and are kept in a state of rolling in point-contact with the inner-race raceway surface 46a and the outer-race raceway surface 47a. The rest of the balls 48, which are positioned in portions other than both ends of the long axis Lmax, are held in between the inner-race raceway surface 46a and the outer-race raceway surface 47a, in a freely rollable loose state with gaps. The portions where the loose balls 48 are positioned fluctuate in accordance with operating conditions of the strain wave gearing device 1, but are roughly as follows. Considering whether an angle of these portions is positive or negative in relation to a short axis Lmin, counterclockwise is a positive direction and clockwise is a negative direction. At maximum, these portions can be in an angle range of about −75° to about −75° centered about the short axis Lmin. At minimum, these portions can be in an angle range of about −40° to about −40° centered about the short axis Lmin. The angle range also increases commensurately with respect to greater reduction ratios. For example, the angle range when the reduction ratio is 160 is greater than the angle range when the reduction ratio is 30.

When the wave generator 4 rotates about a center axis 1a, the meshing positions of the gears 2, 3 move in a circumferential direction. Due to this rotation, relative rotation occurs between the externally toothed gear 3 and the internally toothed gear 2 in accordance with a difference in the number of teeth between the external teeth 35 and the internal teeth 21. For example, if the internally toothed gear 2 is secured and the wave generator 4 is a high-speed-rotation input element, the externally toothed gear 3 is a reduced-rotation output element, from which rotation output, reduced according to the difference in the number of teeth between the gears 2, 3, is acquired.

Figure 2:
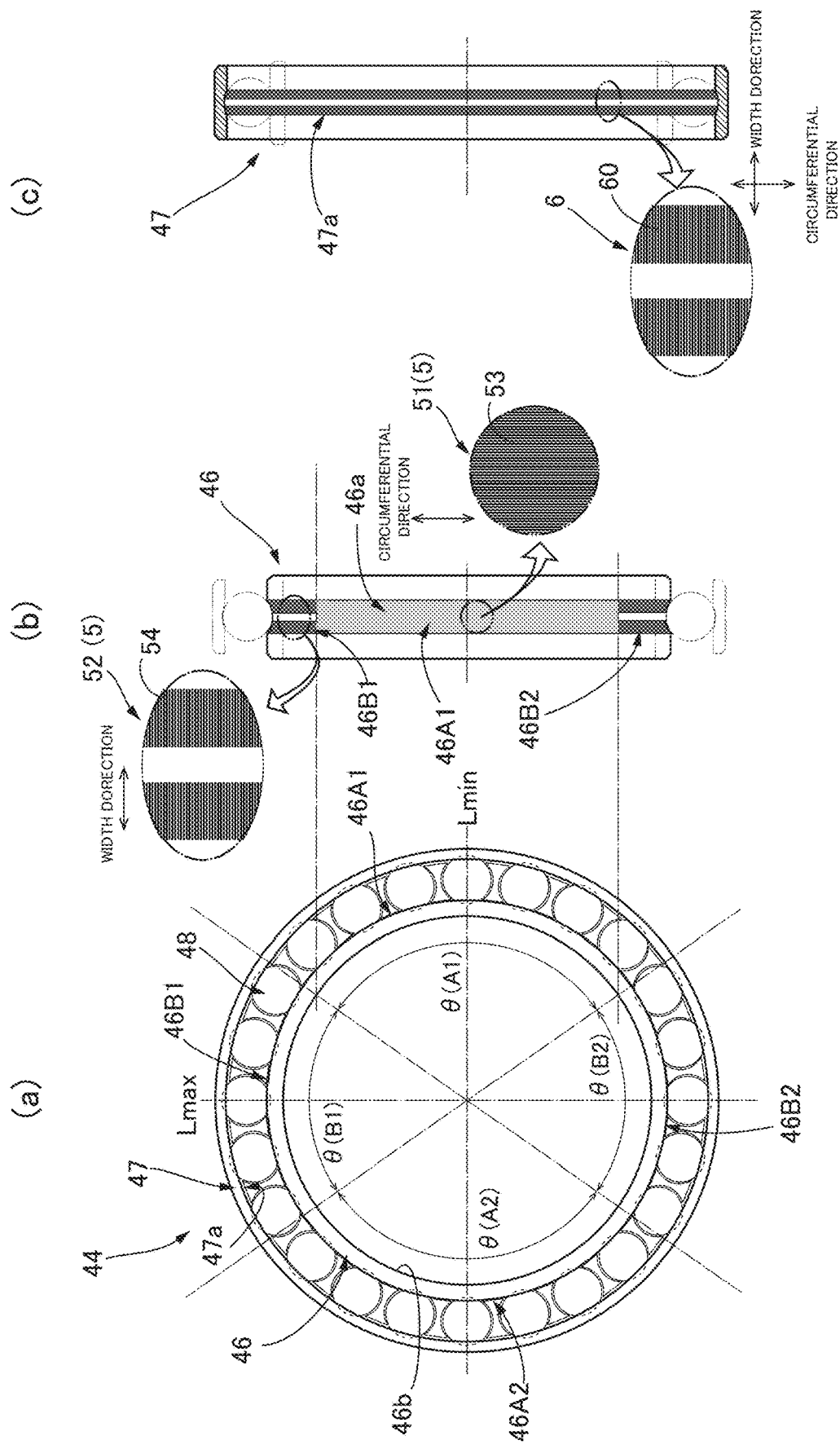
FIG. 2(*a*) is a schematic end view of a wave generator bearing, FIG. 2(*b*) is an explanatory drawing of a groove pattern formed in an inner-race raceway surface thereof, and FIG. (*c*) is an explanatory drawing of a groove pattern formed in an outer-race raceway surface thereof.

FIG. 2(a) is an end view of the wave generator plug 43 and the wave generator bearing 45 of the wave generator 4, FIG. 2(b) is an explanatory drawing of an inner-race lubrication groove pattern formed in the inner race 46, and FIG. 2(c) is an explanatory drawing of an outer-race lubrication groove pattern formed in outer race 47. The inner-race raceway surface 46a, which has an arcuately curved cross-sectional shape, is formed in an external peripheral surface of the inner race 46. An inner-race lubrication groove pattern 5 is formed in the inner-race raceway surface 46a. Similarly, the outer-race raceway surface 47a, which has an arcuately curved cross-sectional shape, is formed in an internal peripheral surface of the outer race 47. An outer-race lubrication groove pattern 6 is formed in the outer-race raceway surface 47a.

The inner-race lubrication groove pattern 5 is configured from linear lubrication grooves extending in straight lines, curved lines, or a wave-like form. The lubrication grooves have a width and a depth of several tens of nanometers to several microns, and are arranged at a pitch of several tens of nanometers to several microns. The inner-race lubrication groove pattern 5 includes a first groove pattern 51 and a second groove pattern 52. The first groove pattern 51 is configured from first lubrication grooves 53. The first groove pattern 51 is formed in short-axis-side inner-race raceway surface portions 46A1, 46A2, which include the positions of the short axis Lmin of the ellipsoid, in the circumferential direction of the inner-race raceway surface 46a. The second groove pattern 52 is formed in long-axis-side inner-race raceway surface portions 46B1, 46B2, which include the rest of the inner-race raceway surface 46a, i.e., the positions of the long axis Lmax. The second groove pattern 52 is configured from second lubrication grooves 54.

As is shown in FIGS. 2(a) and 2(b), the short-axis-side inner-race raceway surface portions 46A1, 46A2 in the inner-race raceway surface 46a are portions $\theta(A1)$, $\theta(A2)$ of angle ranges that are 40°-75° clockwise and counterclockwise, respectively, in the circumferential direction of the inner-race raceway surface 46a, centered about the positions of the short axis Lmin of the ellipsoid. In the inner-race raceway surface 46a, the remaining angle range portions $\theta(B1)$, $\theta(B2)$ are the long-axis-side inner-race raceway surface portions 46B1, 46B2 in which the second groove pattern 52 is formed.

FIG. 2(b) schematically represents, in enlargement, part of the first groove pattern 51 and part of the second groove pattern 52. The first groove pattern 51 is configured from the first lubrication grooves 53 for holding a lubricant and guiding the lubricant in the circumferential direction of the inner-race raceway surface 46a. To enable the lubricant to be guided in the circumferential direction, the first lubrication grooves 53 extend so that the direction in which the first lubrication grooves 53 are aligned includes a directional component facing in the circumferential direction of the inner-race raceway surface 46a. In the present example, the first lubrication grooves 53 are grooves extending in straight lines along the circumferential direction of the inner-race raceway surface 46a, as is shown in a schematic enlargement in FIG. 2(b). The first lubrication grooves 53 may be aligned in a direction inclined relative to the circumferential direction. Additionally, straight-line grooves are not provided by way of limitation on the first lubrication grooves 53; these grooves can also extend in curved lines or a wave-like form. Additionally, the first groove pattern 51 is formed in the short-axis-side inner-race raceway surface portions 46A1, 46A2, throughout the entire width direction and circumferential direction thereof.

The groove width, groove depth, and inter-groove spacing (pitch) can be the same in all portions of the first lubrication grooves 53 of the first groove pattern 51. Additionally, the groove width, groove depth, and inter-groove spacing of the first lubrication grooves 53 can be made to gradually increase or gradually decrease along a length direction of these grooves. As one example, the groove width and/or groove depth of the first lubrication grooves 53 is brought to a minimum at the positions of the short axis Lmin and is gradually increased toward the long axis Lmax. The amount of lubricant can thereby be supplied to and held in the portions near the long axis Lmax where the tightly held balls 48 are positioned can thereby be greater than the amount of lubricant supplied to and held in the portions near the short axis Lmin.

The second groove pattern 52 of the long-axis-side innerrace raceway surface portions 46B1, 46B2 is configured from the second lubrication grooves 54 for holding the lubricant. In the present example, the direction in which the second lubrication grooves 54 are aligned is the width direction of the inner-race raceway surface 46a (a direction along a bearing center axis), as is shown in a schematic enlargement in FIG. 2(b). The second groove pattern 52 may be a pattern in which the second lubrication grooves 54 are aligned in the circumferential direction or in a direction inclined relative to the circumferential direction.

Straight-line grooves are not provided by way of limitation on the second lubrication grooves 54; these grooves can also extend in curved lines or a wave-like form. Additionally, a mesh can also be formed, in which second lubrication grooves 54 aligned in different directions intersect. The groove width, groove depth, and inter-groove spacing of the second lubrication grooves 54 can be gradually increased or gradually reduced along a length direction thereof.

Furthermore, the second groove pattern 52 can be formed in the long-axis-side inner-race raceway surface portions 46B1, 46B2 throughout the entire width direction and circumferential direction thereof. Alternatively, grooved regions in which the second groove pattern 52 is formed and non-grooved regions in which the second groove pattern 52 is not formed may be formed in an alternating fashion along the width direction or the circumferential direction. In the present example, as shown in FIG. 2(b), a non-grooved region extending in the circumferential direction and having a fixed width is formed in a widthwise center, and on both sides thereof, grooved regions are formed in which the second groove pattern 52 is formed.

The outer-race lubrication groove pattern 6 formed in the outer race 47 shall next be described. FIG. 2(c) schematically represents, in enlargement, part of the outer-race lubrication groove pattern 6. The outer-race lubrication groove pattern 6 is configured from linear third lubrication grooves 60 extending in straight lines, curved lines, or a wave-like form. The third lubrication grooves 60 have a width and a depth of several tens of nanometers to several microns, and are arranged at a pitch of several tens of nanometers to several microns.

In the outer-race lubrication groove pattern 6, the third lubrication grooves 60 extend in straight lines in a width direction of the outer-race raceway surface 47a in the present example, as is schematically depicted in the enlargement in FIG. 2(c). The third lubrication grooves 60 may be aligned in a direction inclined relative to the circumferential direction.

Additionally, straight-line grooves are not provided by way of limitation on the third lubrication grooves 60; these grooves can also extend in curved lines or a wave-like form. Additionally, a mesh can also be formed, in which the third lubrication grooves 60 aligned in different directions intersect.

The outer-race lubrication groove pattern 6 can be formed in the outer-race raceway surface 47a, throughout the entire width direction and circumferential direction thereof. Alternatively, grooved regions in which the outer-race lubrication groove pattern 6 is formed and non-grooved regions in which the outer-race lubrication groove pattern is not formed may be formed in an alternating fashion along the width direction or the circumferential direction. In the present example, as shown in FIG. 2(c), a non-grooved region extending in the circumferential direction and having a fixed width is formed in a widthwise center, and on both sides thereof, grooved regions are formed in which the outer-race lubrication groove pattern 6 is formed.

The groove width, groove depth, and inter-groove spacing (pitch) can be the same in all portions of the third lubrication grooves 60. Additionally, the groove width, groove depth, and inter-groove spacing of the third lubrication grooves 60 can be made to gradually increase or gradually decrease along a length direction of these grooves. As one example, the groove width and/or groove depth of the third lubrication grooves 60 is brought to a maximum at the positions of the long axis Lmax and is gradually reduced toward the short axis Lmin. A greater amount of lubricant can thereby be held in the portions of the long axis Lmax where the tightly held balls 48 are positioned.

The inner-race lubrication groove pattern 5 and outer-race lubrication groove pattern 6 described above can be formed by, for example, laser processing using a femtosecond laser, etc. These patterns can also be formed by a processing method such as machining or etching. Additionally, the first, second, and third lubrication grooves 53, 54, 60 can also be imparted with various cross-sectional shapes such as a rectangular cross section, a semicircular cross section, and a V groove.

(Groove Alignment Pattern)

FIG. 3 shows schematic diagrams of examples of alignment patterns that can be adopted as the inner-race lubrication groove pattern 5 and the outer-race lubrication groove pattern 6. In the description below, the inner-race raceway surface 46a in which the first and second lubrication grooves 53, 54 are formed and the outer-race raceway surface 47a in which the third lubrication grooves 60 are formed are described as groove formation surfaces, and the first, second, and third lubrication grooves 53, 54, 60 are described as fine grooves. FIG. 3 exemplifies typical arrangement patterns and arrangement patterns that can be adopted in the present invention are not limited to the examples shown in FIG. 3.

In the groove formation surfaces, fine grooves are formed in arrangement patterns extending in straight lines or curved lines in a predetermined direction at a predetermined pitch. For example, as shown in FIG. 3(a), an arrangement pattern can be used in which fine grooves extend in straight lines in the circumferential direction of the groove formation surface (the circumferential direction of the inner-race raceway surface 46a, the circumferential direction of the outer-race raceway surface 47a) at a fixed pitch. As shown in FIG. 3(b), a groove formation surface can have an arrangement pattern in which fine grooves extend in a wave-like form in the circumferential direction at a fixed pitch.

As shown in FIG. 3(c), a groove formation surface can have an arrangement pattern in which fine grooves, arranged at a fixed pitch, extend in straight lines in a width direction (the width direction of the inner-race raceway surface 46a, the width direction of the outer-race raceway surface 47a) orthogonal to the circumferential direction of the groove formation surface. Fine grooves extending in the width direction do not include a directional component aligned in the circumferential direction, and are therefore not used in the first lubrication grooves 53 constituting the first groove pattern 51 formed in the short-axis-side inner-race raceway surface portions 46A1, 46A2. As shown in FIG. 3(d), a groove formation surface can have an arrangement pattern in which fine grooves, arranged at a fixed pitch, extend in a wave-like form in a width direction orthogonal to the circumferential direction of the groove formation surface. Additionally, as shown in FIG. 3(e), a groove formation surface can have an inclined arrangement pattern in which fine grooves, arranged at a fixed pitch, extend in straight lines in an oblique direction that is inclined relative to the circumferential direction and the width direction of the groove formation surface.

As is shown in FIGS. 3(f) and (g), the same groove formation surface can have an intersecting arrangement pattern, which is the intersecting of a first-direction arrangement pattern in which fine grooves extend in a first direction at a fixed pitch and a second-direction arrangement pattern in which fine grooves extend in a second direction, different from the first direction, at a fixed pitch. In the intersecting arrangement pattern shown in FIG. 3(f), the first-direction arrangement pattern is composed of fine grooves extending in straight lines in the circumferential direction, and the second-direction arrangement pattern is composed of fine grooves extending in straight lines in the width direction. In the intersecting arrangement pattern shown in FIG. 3(g), the first-direction arrangement pattern is an inclined arrangement pattern formed from straight-line fine grooves extending in a direction inclined 45 degrees relative to the circumferential direction and the width direction, and the second-direction arrangement pattern is an inclined arrangement pattern formed from straight-line fine grooves extending in a direction inclined 45 degrees in the opposite direction relative to the circumferential direction and the width direction. Furthermore, an intersecting arrangement pattern that is an overlapping of the arrangement pattern shown in FIG. 3(a) and the arrangement pattern shown in FIG. 3(b) can also be formed in a groove formation surface.

The invention claimed is:

1. A wave generator of a strain wave gearing device, comprising:
 a wave generator plug provided with an ellipsoidal external peripheral surface; and a wave generator bearing mounted and secured to the ellipsoidal external peripheral surface and caused to flex into an ellipsoidal shape, wherein
 the wave generator bearing has an outer race and inner race capable of flexing in a radial direction, and a plurality of rolling elements inserted in a rollable state between the outer race and the inner race;
 an inner-race lubrication groove pattern configured from first lubrication grooves and second lubrication grooves is formed in an inner-race raceway surface of the inner race;
 an outer-race lubrication groove pattern configured from third lubrication grooves is formed in an outer-race raceway surface of the outer race;
 the first, second, and third lubrication grooves are linear grooves having a width and a depth of several tens of nanometers to several microns, and extend in straight lines, curved lines, or a wave-like form;
 the inner-race lubrication groove pattern includes a first groove pattern in which the first lubrication grooves are arranged at a pitch of several tens of nanometers to several microns, and a second groove pattern in which the second lubrication grooves are arranged at a pitch of several tens of nanometers to several microns;
 the outer-race lubrication groove pattern is a pattern in which the third lubrication grooves are arranged at a pitch of several tens of nanometers to several microns;
 in the inner-race raceway surface, the first groove pattern of the inner-race lubrication groove pattern is formed in short-axis-side inner-race raceway surface portions including positions on a short axis of the ellipsoidal shape, and the second groove pattern of the inner-race lubrication groove pattern is formed in long-axis-side inner-race raceway surface portions including positions on a long axis of the ellipsoidal shape; and
 in the first groove pattern, the first lubrication grooves extend so that a direction in which the first lubrication grooves are aligned includes a directional component facing a circumferential direction of the inner-race raceway surface.

2. The wave generator of the strain wave gearing device according to claim 1,
 wherein the short-axis-side inner-race raceway surface portions where the first groove pattern is formed are portions of angle ranges that are 40°-75° clockwise and counterclockwise, respectively, in the circumferential direction of the inner-race raceway surface, centered about the positions on the short axis of the ellipsoidal shape.

3. The wave generator of the strain wave gearing device according to claim 2,
 wherein the first groove pattern is formed in the short-axis-side inner-race raceway surface portions throughout an entire width direction and circumferential direction of the short-axis-side inner-race raceway surface portions; and
 wherein,
 in the long-axis-side inner-race raceway surface portions,
 the second groove pattern is formed throughout an entire width direction and circumferential direction of the long-axis-side inner-race raceway surface portions; or
 first grooved regions in which the second groove pattern is formed and first non-grooved regions in which the second groove pattern is not formed are formed in an alternating fashion along the width direction or the circumferential direction of the long-axis-side inner-race raceway surface portions.

4. The wave generator of the strain wave gearing device according to claim 3,
 wherein, in the outer-race raceway surface,
 the outer-race lubrication groove pattern is formed throughout an entire width direction and circumferential direction of the outer-race raceway surface; or
 second grooved regions in which the outer-race lubrication groove pattern is formed and second non-grooved regions in which the outer-race lubrication groove pattern is not formed are formed in an alternating fashion along the width direction or the circumferential direction of the outer-race raceway surface.

5. The wave generator of the strain wave gearing device according to claim 4,
 wherein the first groove pattern of the inner-race lubrication groove pattern is configured from the first lubrication grooves extending in the circumferential direction of the inner-race raceway surface;
 the second groove pattern is configured from the second lubrication grooves extending in the width direction of the inner-race raceway surface; and
 the outer-race lubrication groove pattern is configured from the third lubrication grooves extending in the width direction of the outer-race raceway surface.

6. The wave generator of the strain wave gearing device according to claim 5,
- the first lubrication grooves of the first groove pattern are made so that either one or both of a groove width and a groove depth thereof gradually increase from the positions on the short axis toward the positions on the long axis;
- the second lubricant grooves of the second groove pattern are made so that either one or both of a groove width and a groove depth thereof gradually decrease from the positions on the long axis toward the positions on the short axis; and
- the third lubrication grooves of the outer-race lubrication groove pattern are made so that either one or both of a groove width and a groove depth thereof gradually increase from the positions on the short axis toward the positions on the long axis.

7. A strain wave gearing device, comprising:
a rigid internally toothed gear;
a flexible externally toothed gear; and
the wave generator as set forth in claim 1.

8. The wave generator of the strain wave gearing device according to claim 1,
- wherein the width, depth, and pitch of the first grooves and the second grooves are sufficient to hold lubricant.

9. The wave generator of the strain wave gearing device according to claim 1,
- wherein the width, depth, and pitch of the first grooves are sufficient to hold and guide lubricant in the circumferential direction of the inner-race raceway surface.

10. The wave generator of the strain wave gearing device according to claim 1,
- wherein the width, depth, and pitch of the second grooves and third grooves are sufficient to hold lubricant.

11. The wave generator of the strain wave gearing device according to claim 9,
- wherein the width, depth, and pitch of the second grooves and third grooves are sufficient to hold the lubricant.

* * * * *